United States Patent
Stippick

(12) 
(10) Patent No.: US 6,267,359 B1
(45) Date of Patent: Jul. 31, 2001

(54) ADVANCED TRAY SUPPORT SYSTEM USING ORTHOGONAL GRILLAGE

(75) Inventor: John Stippick, Spring, TX (US)

(73) Assignee: Stone & Webster Engineering Corp., Houston, TX (US)

( * ) Notice: Subject to any disclaimer, the term of this patent is extended or adjusted under 35 U.S.C. 154(b) by 0 days.

(21) Appl. No.: 08/430,937

(22) Filed: Apr. 26, 1995

(51) Int. Cl.⁷ ............................................. B01F 3/04
(52) U.S. Cl. .................................................. 261/114.5
(58) Field of Search ......................... 261/114.5, 114.4

(56) References Cited

U.S. PATENT DOCUMENTS

| | | | |
|---|---|---|---|
| 2,582,657 | * 1/1952 | Serner | 261/114.5 |
| 2,611,596 | * 9/1952 | Colitsch | 261/114.5 |
| 2,664,280 | * 12/1953 | Kohn | 261/114.5 |
| 2,767,967 | 10/1956 | Hutchinson | 261/113 |
| 3,056,592 | * 10/1962 | Thrift | 261/114.4 |
| 3,307,822 | * 3/1967 | Stout | 249/189 |
| 3,414,246 | 12/1968 | Weeden et al. | 261/113 |
| 3,649,466 | 3/1972 | Boon et al. | 202/158 |
| 3,914,352 | 10/1975 | Guerrieri | 261/114 |
| 4,028,443 | 6/1977 | Livingston et al. | 261/114 |
| 4,120,919 | * 10/1978 | McClain | 261/114.5 |
| 4,133,852 | * 1/1979 | DiNicolantonio et al. | 261/114.5 |
| 4,442,048 | * 4/1984 | Abernathy et al. | 261/114.5 |
| 4,673,464 | * 6/1987 | Zeitsch | 261/114.5 |
| 4,976,823 | * 12/1990 | Davis | 261/114.5 |
| 5,130,102 | 7/1992 | Jones, Jr. | 422/191 |
| 5,338,517 | 8/1994 | Evans, III et al. | 422/191 |
| 5,431,366 | * 7/1995 | Matsumoto et al. | 249/189 |
| 5,454,989 | * 10/1995 | Nutter | 261/114.5 |

* cited by examiner

*Primary Examiner*—Robert Davis
(74) *Attorney, Agent, or Firm*—Hedman & Costigan, P.C.

(57) ABSTRACT

The present invention relates to the use of orthogonal tray stiffeners in supporting tray panels for process tray.

5 Claims, 3 Drawing Sheets

ADVANCED TRAY SUPPORT SYSTEM USING ORTHOGONAL GRILLAGE

The present invention relates to a method and apparatus for supporting process trays. More particularly, the present invention relates to a method and apparatus for providing a tray which can support heavy loadings with low degree of deflection and which requires fewer or no non-integral support beams.

As used throughout this document, the following definitions shall apply:

"process" shall be taken to mean, but not necessarily limited to Distillation, Flashing, Rectification, Absorption, Stripping, Evaporation, Humidification, Dehumidification, Dephlegmation, Spray Drying, Heat Transfer or any combination thereof.

"Tray", shall be taken to be any plate type contact device used in liquid-gas or liquid-liquid mass and/or heat transfer operations. Mass and/or heat transfer process equipment using trays is based on a combination of operating principles essentially defined by three categories:

1. Mode of flow of streams: Counter-current; Co-current; and Cross-flow.
2. Gross mechanism of transfer: Differential; Integral.
3. Continuous phase: Gas (or Vapor); Liquid.

Further, a tray may be composed of one or more tray panels.

"Tray Panel", shall be taken to mean either a single sheet metal part or one of any other number of sheet metal parts forming a tray.

"Non-integral Stiffener", shall be taken to be any kind of stiffening not permanently affixed to the tray. This definition includes, but is not necessarily limited to, supporting beams composed of structural steel and/or fabricated beams.

"Support Beams", shall be taken to be non-integral stiffeners including, but not necessarily limited to, structural steel shapes such as "wide flange beams", "channels", "angles", or the like.

"Stiffener", shall be taken to expressly exclude non-integral stiffeners of any sort. Further, stiffener shall be taken to be a permanently attached part intended to lend stiffness or rigidity to the tray.

"Column", shall be taken to be any process apparatus designed to contain trays.

BACKGROUND OF THE PRESENT INVENTION

The use of trays to assist in the separation of constituents in a mixture has long been known in the art. For example, process trays sold under the trademark RIPPLE TRAY used as fractionation trays are described in Hutchinson, U.S. Pat. No. 2,767,967; rod tower trays are described in Weeden et al., U.S. Pat. No. 3,414,246; and bubble cap trays are described in Guerrieri, U.S. Pat. No. 3,914,352. See also Perry & Chilton, Chemical Engineer's Handbook, 6th ed., 21-74–21-77, for a general description of perforated-plate or sieve-plate trays.

In supporting trays within the column, support beams are generally mounted in the column and trays are rested upon the support beams and the trays are fastened to the sides of the column. See, Boon et al., U.S. Pat. No. 3,649,466. In Livingston et al., U.S. Pat. No. 4,028,443 circular rings are employed to support the perforated plate.

Although the use of support beams to support trays provides sufficient support to the trays to sustain a given deflection criterion, the use of support beams suffers from both technical and economic disadvantages.

Economically, support beams are physically large, constitute large quantities of materials, are expensive and are difficult to install, especially in revamping an existing column in the field. Technically, support beams typically have the effect of becoming partitions within the columns, thus inhibiting the free movement of process gases through the column and thereby potentially causing deleterious effects upon the process itself. Still further, the use of support beams reduces the active area of the tray because the horizontal flange of the beam blocks the part of the tray which could otherwise be active for process reasons.

SUMMARY OF THE PRESENT INVENTION

The trays designed and built in accordance with the present invention constitute an improvement over all known trays employed in industry practice, whether the trays are flat or corrugated, simple perforated or valve type, with or without downcomers of any sort.

It is therefore an object of the present invention to provide new and useful improvements to the support of trays. The use of the trays of the present invention are generally self supporting, thereby enabling a reduction in the number of support beams required for a given column diameter as compared to the trays of the prior known art, or in some cases the complete elimination of such support beams.

It is a further object of the present invention to provide trays which are resistant to explosive uplift forces which are common in some process applications.

It is another object of the present invention to improve the process utility of the trays by facilitating the free movement of the process gas flow between the various sections of the columns.

It is still a further object of the present invention to provide economic advantages over the prior known art of tray support systems. Elimination and/or reduction in the number of support beams, beam seats, clips and bolting reduces the material costs of the trays, as well as the labor costs concomitant with their installation within new columns.

It is still another further object of the present invention to facilitate the revamping of existing columns. The use of support beams in revamping columns causes significant problems. Therefore, placement of support beams within a column is burdensome and time consuming. Normally beams must pass through small diameter manways. Fitting and welding beam seats and clips within the column is likewise burdensome and time consuming and has the further disadvantage of requiring welding to the pressure containing membrane.

The tray support system of the present invention overcomes all of the aforementioned disadvantages. The above and other objects and advantages shall become more apparent in light of the following description and accompanying drawings.

DETAILED DESCRIPTION OF THE PRESENT INVENTION

As used throughout the present specification, the terms "process", "tray", "stiffener", etc. shall be as here-to-fore defined.

As used throughout the present specification the term "stiffener" expressly excludes any sort of non-integral stiffener, including but not necessarily limited to support beams.

Figures 2, 2A:
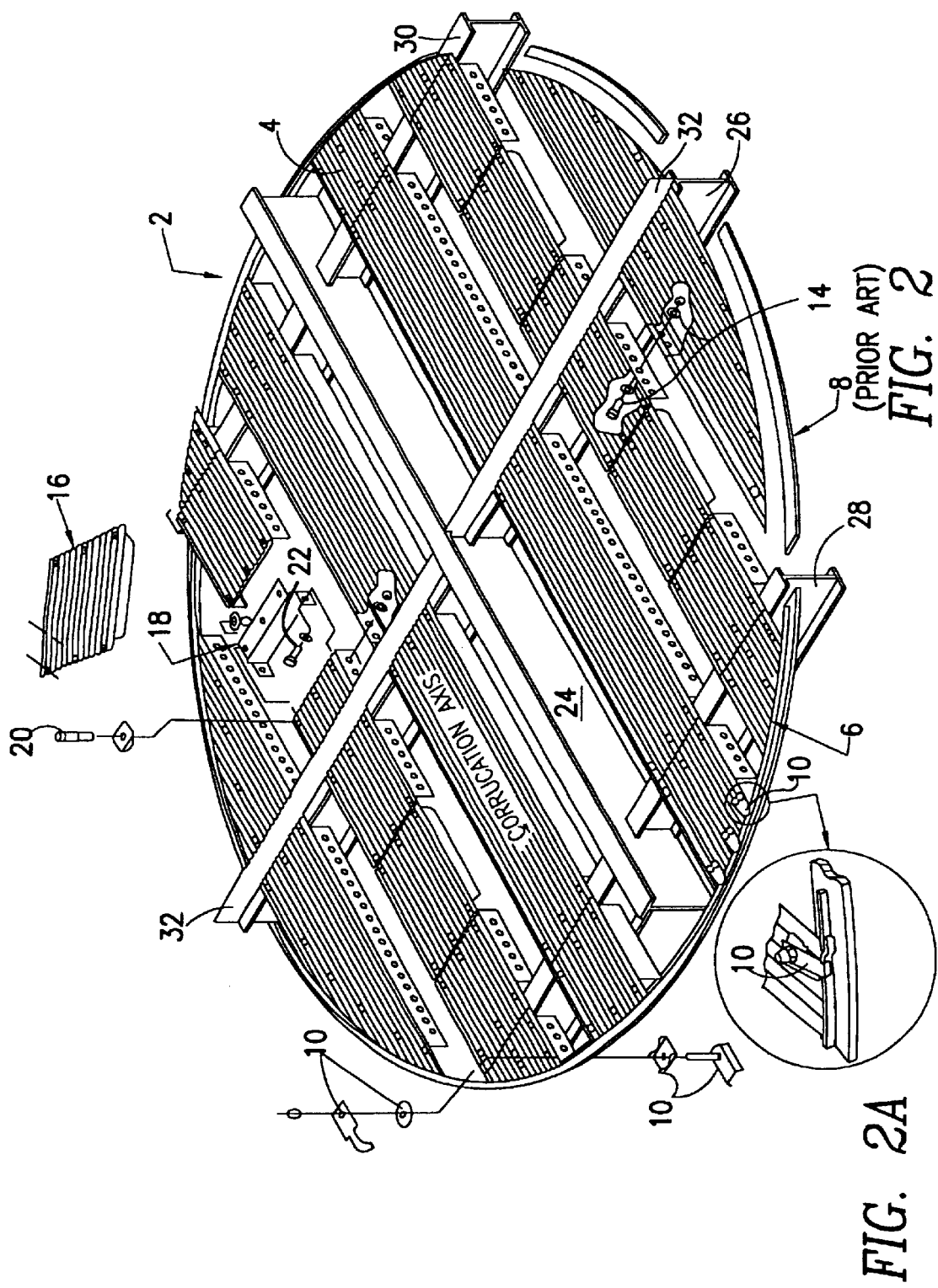
FIG. 2 shows an exploded planar view of a process tray sold under the trademark RIPPLE TRAY of the prior art.
FIG. 2A shows a clipping mechanism useful in the practice of the prior art process tray sold under the trademark RIPPLE TRAY.

Referring to FIG. 2 there is shown a process tray sold under the trademark RIPPLE TRAY 2 of the prior known art. A process tray sold under the trademark RIPPLE TRAY 2 comprises several corrugated tray panels 4 which are attached at their respective outer ends to a circular shaped seal ring 6, such as by clamping means 10 as best seen in FIG. 2A. The seal ring 6 and the a process tray sold under the trademark RIPPLE TRAY are supported and attached to the column interior wall by tray support ring 8, such as by clamping means 10. The tray panels 4 may further be attached to one another via bolting means 14.

Typically one of the panels shall also include a manway panel 16. The manway panel is attached to the tray panel via bolt means 20 for easy removal to provide access to the tray for servicing. The manway panel may further be supported by manway stiffener 18 which is attached to the tray panel via bolt means 22.

The tray panels 2 of the prior known art are additionally supported by one major support beam 24 and three additional support beams 26, 28 and 30 which are positioned perpendicular to the major support beam 24. The centrally located beam 26 is further equipped with a quadrant baffle 32.

Thus it can be seen that the prior art method of support included the use of a network of support beams to support each tray in the column.

Figures 3, 3A:
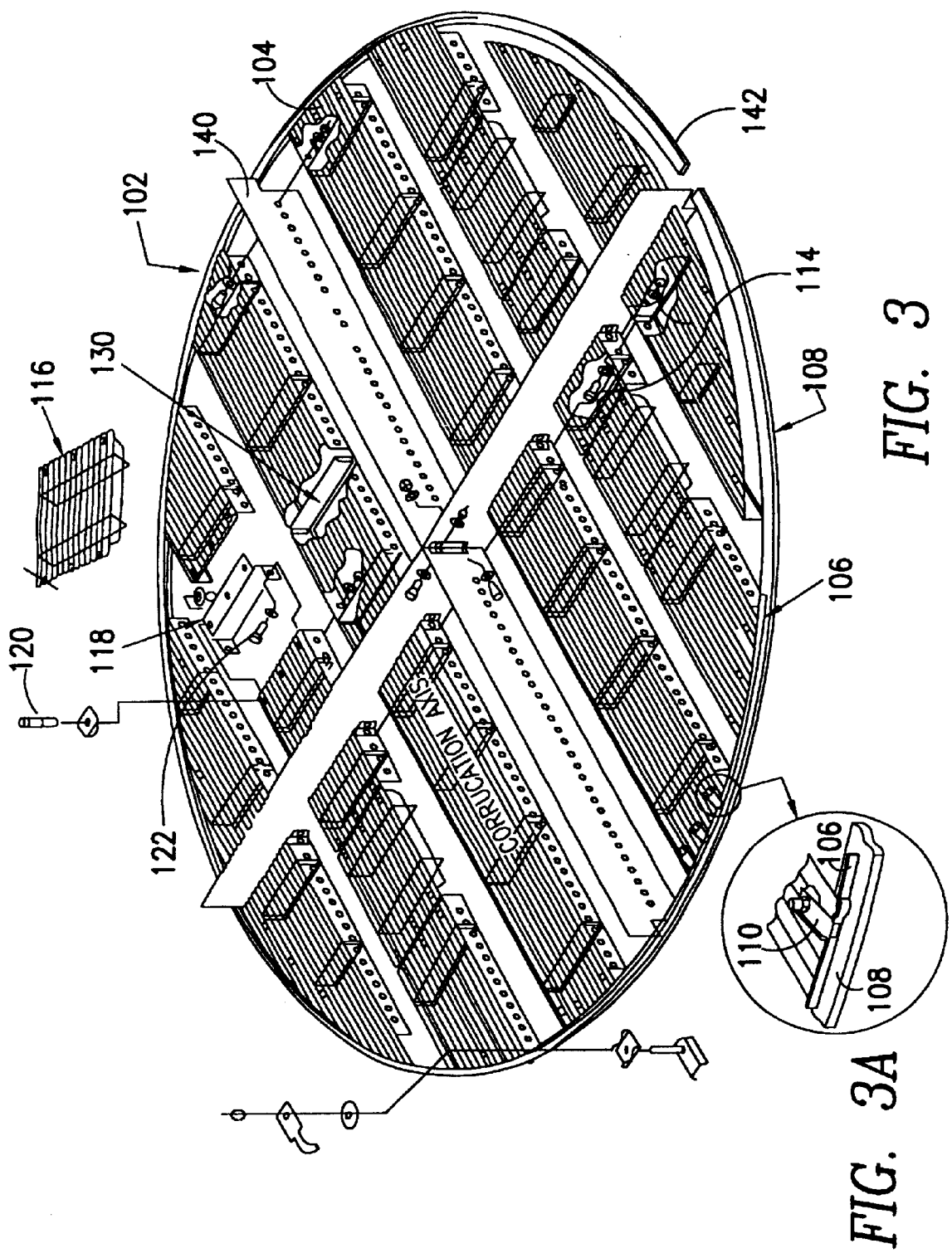
FIG. 3 shows an exploded planar view of a RIPPLE TRAY of the present invention.
FIG. 3A shows a clipping mechanism useful in the practice of the RIPPLE TRAYS of the present invention.

Referring now to FIG. 3, there is depicted a tray 102 of the present invention. The tray 102 is comprised of a series of tray panels 104 which are attached at the outer edge to a seal ring 106. The seal ring 106 is secured to the interior column wall via a tray support ring 108 by a clamp 110, such as shown in FIG. 3A. The tray panels themselves may be further attached to one another, such as by bolting means 114.

Each of the tray panels 104 is supported by at least one tray stiffener 130. Preferably a plurality of equidistant stiffeners are employed along the length of each of the tray panels 104. The tray stiffeners 130 are members which are relatively lightweight and are of the same length or shorter than the width of the tray panels. They are typically constructed of the same gage sheet metal as the trays.

The tray stiffeners are positioned orthogonal to the length of the tray panel and are employed in a sufficient number to maintain the tray panel deflection to within a given criterion. In a preferred embodiment, a tray for distilling crude oil in a column of 216 inch diameter would utilize twelve 18 inch wide tray panels, each panel having twelve equidistant stiffeners to maintain the tray panel deflection to below one-sixteenth of an inch. The stiffeners are attached to the tray panels at the time of constructing the tray panels by a properly qualified welding procedure.

Figure 1:
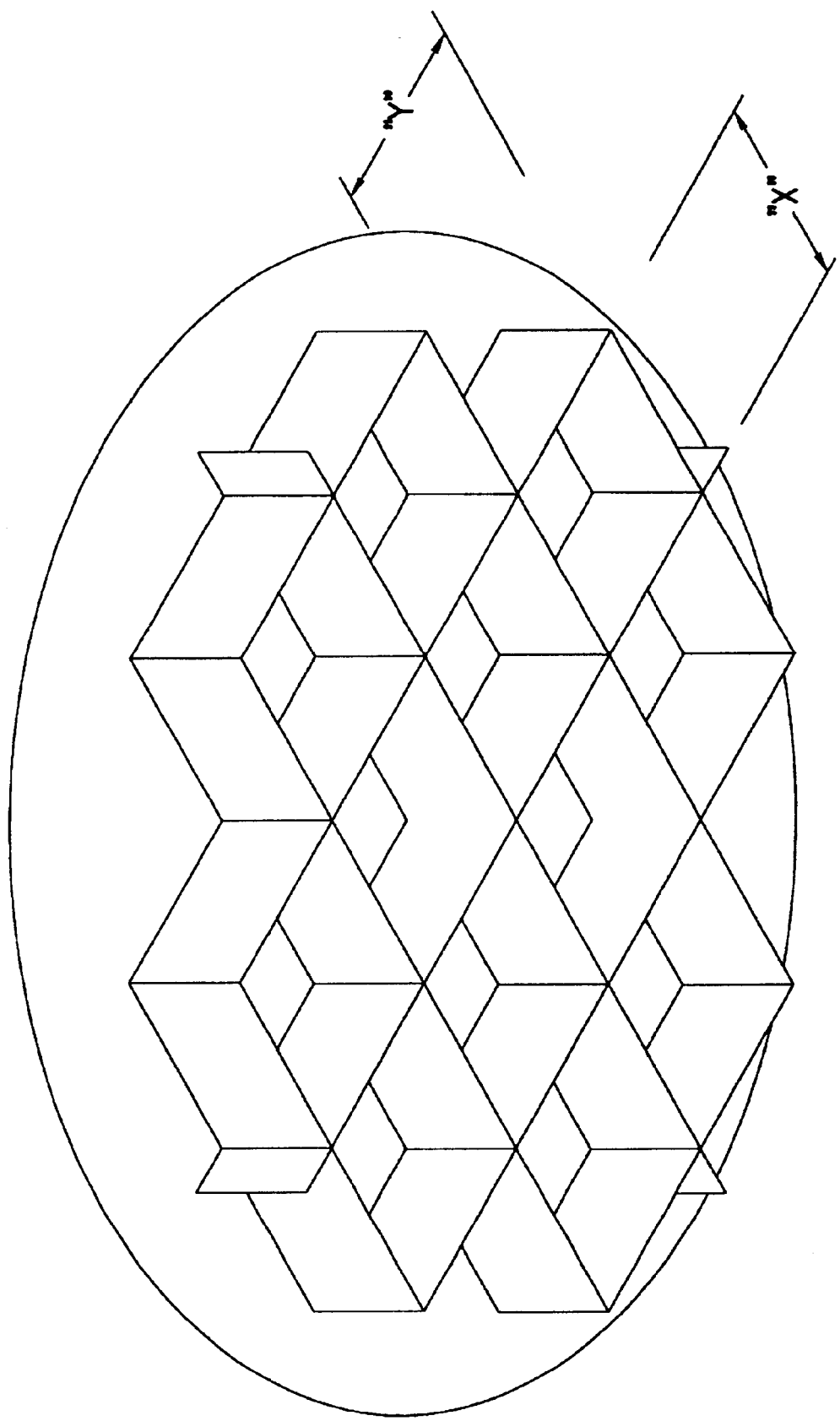
FIG. 1 shows a view taken from the bottom of a tray deck/orthogonal grillage support system.

A preferred embodiment of the orthogonal grillage of the present invention is shown in FIG. 1. In FIG. 1, X represents the width of tray panels and Y represents the spacing of orthogonally located stiffeners, where X is less than or equal to Y.

The use of the stiffeners enables the reduction in the number of support beams required to adequately support the tray panels, and in most cases, except for extremely large diameter columns, the elimination for the need of support beams altogether.

This novel method and apparatus of orthogonal grillage provides numerous advantages over the prior known art which employs conventional support beams. The use of the tray stiffeners of the present invention provides simpler construction, high strength and resistance to deflection compared to material weight, lowers the cost of materials and labor, eliminates the partitioning caused by the prior art labyrinth of support beams and increases the active tray area.

Additionally, this method of support also allows a reduction of the tray-to-tray distance, and concomitantly, the total height of the column.

Furthermore, the use of the trays of the present invention provides improvements to revamping existing columns. The elimination of support beams and the parts required to affix them within the column simplifies the tray installation. Placement of the support beams of the prior known art within a column, which must normally pass through small diameter manways, is burdensome and time consuming. Additionally, fitting and welding beam seats and clips within the column is likewise labor intensive and has the further disadvantage of requiring welding to the pressure containing membrane.

Generally, this welding necessitates adherence to the rules of local jurisdictional (legal) authority. Minimally, this requires that the work be performed by a duly licensed entity under the supervision of an Authorized Inspector; the production and qualification of welding procedures; and the qualification of welders. Performance of the welding may require post weld heat treatment of an existing column at significant expense. All these disadvantages are eliminated by the present invention.

The trays of the present invention, having tray panels supported by preattached tray stiffeners are merely assembled into the column and attached at the edges to the tray support ring. Thus, the process of revamping is greatly simplified.

The trays of the present invention may also preferably include quadrant baffles means 140 and 142, which serve to partition the tray into four quadrants to enhance the separation process.

Additionally, one of the tray panels may also be equipped with a manway panel 116 to allow access to the tray. The manway panel 116 is supported by manway stiffener 118 and is attached to the panel via bolting means 118, 120 and 122.

The tray stiffeners of the present invention may be employed on any of the known trays useful in any mass and/or heat transfer process. The trays may be employed in any of the known contacting apparatuses which typically employ trays to facilitate and/or improve process efficiency. These include, but are not necessarily limited to all mass and/or heat transfer processes.

Many variations of the present invention will suggest themselves to those skilled in the art in light of the above-detailed description. All such obvious modifications are within the full intended scope of the appended claims.

All of the above-referenced patents, patent applications and publications are hereby incorporated by reference.

What is claimed is:

1. A method of providing support to a circular tray comprised of one or more tray panels, said method comprising providing each said tray panel with equidistantly spaced stiffeners located perpendicular to and connected to the bottom surface of said tray panel and positioned in a manner that said stiffeners cooperate to form a continuous and orthogonal grill under said tray.

2. A method as defined in claim 1 wherein said circular tray further comprises two baffle means to separate said circular tray into four equal sized quadrants.

3. A method of providing support to a tray of a column of a contacting apparatus, the tray comprised of one or more tray panels, said method comprising providing each said tray panel with equidistantly spaced stiffeners located perpendicular to and connected to the bottom surface of said tray panel and positioned in a manner that said stiffeners cooperate to form a continuous and orthogonal grill under said tray, wherein said contacting apparatus does not include support beams for said tray.

4. A method of revamping a process column comprising a plurality of support beams for supporting tray panels of a tray, said method comprising: removing at least one of said support beams and employing at least one tray comprising one or more tray panels, providing each said tray panel with equidistantly spaced stiffeners located perpendicular to and connected to the bottom surface of said tray panel and positioned in a manner that said stiffeners cooperate to form a continuous and orthogonal grill under said tray.

5. A method as defined in claim 4 wherein said process is selected from the group consisting of a distillation column, a flashing column, a rectification column, an absorption column, a stripping column, an evaporation column, a humidification column, a dehumidification column, a dephlegmation column, and a heat transfer column.

* * * * *